March 15, 1960 R. E. HOTZE ET AL 2,928,929
DEVICE FOR TESTING WELDS
Filed April 25, 1958 9 Sheets-Sheet 1

FIG. 1

INVENTORS
R.E. HOTZE
A.N. TODOROFF
BY C.B. Hamilton
ATTORNEY

March 15, 1960 R. E. HOTZE ET AL 2,928,929
DEVICE FOR TESTING WELDS
Filed April 25, 1958 9 Sheets-Sheet 3

FIG. 6

INVENTORS
R. E. HOTZE
A. N. TODOROFF
BY C. A. Hamilton
ATTORNEY

March 15, 1960 R. E. HOTZE ET AL 2,928,929
DEVICE FOR TESTING WELDS
Filed April 25, 1958 9 Sheets-Sheet 4

INVENTORS
R.E.HOTZE
A.N.TODOROFF
BY C.A. Hamilton
ATTORNEY

FIG. 11

INVENTORS
R.E. HOTZE
A.N. TODOROFF
BY C.A. Hamilton
ATTORNEY

United States Patent Office 2,928,929
Patented Mar. 15, 1960

2,928,929
DEVICE FOR TESTING WELDS

Robert E. Hotze, Westchester, and Alexander N. Todoroff, Chicago, Ill., assignors to Western Electric Company, Incorporated, New York, N.Y., a corporation of New York Application April 25, 1958, Serial No. 730,928

10 Claims. (Cl. 219—80)

This invention relates to devices for testing welds and more particularly to devices for testing the strength of welds between contacts and wires of a wire comb of a wire-spring relay.

In the production of wire-spring relays, a plurality of contacts are welded onto a plurality of wires of a wire comb which is a component of the relay. In order to insure that the welding process is properly accomplished, it is necessary to test some or all of the welds. With this in mind, one of the objects of this invention is to provide a device for testing welds.

Another object of this invention is to provide a device for simultaneously testing the weld strength of a plurality of welds between contacts and wires of a wire-spring relay component.

A further object of this invention is to provide a device for simultaneously testing a plurality of welds between wires and contacts of wire-spring relay combs sequentially advanced into test position.

Still another object of this invention is to provide a device for testing the welds between a plurality of wires and contacts of a plurality of wire-spring relay combs sequentially advanced into test position by a transfer mechanism and for rendering the transfer mechanism inoperative upon the failure of welds on a predetermined member of consecutive combs.

A still further object of this invention is to provide a circuit for controlling a weld testing device.

Another object of this invention is to provide a circuit for controlling a weld testing device operated in cycles and for rendering the device inoperative upon the occurrence of defective welds in a predetermined number of consecutive cycles.

A further object of this invention is to provide a circuit for operating a transfer mechanism and a weld testing device in cycles in timed relationship and for disabling the transfer mechanism upon occurrence of defective welds in a predetermined number of consecutive cycles.

One embodiment of the present invention contemplates a plurality of elements for engaging and applying force to contacts welded to contact wires of a plurality of wire-spring relay combs sequentially advanced into test position by a transfer mechanism, and a plurality of switches actuated by the elements in case of failure of one of the welds. Upon a predetermined number of failures of welds on consecutive combs, a control circuit renders the transfer mechanism inoperative.

Other objects and advantages of the invention will become apparent by reference to the following detailed description and the accompanying drawings illustrating a preferred embodiment of the invention, in which.

Weld testing apparatus

Figure 1:
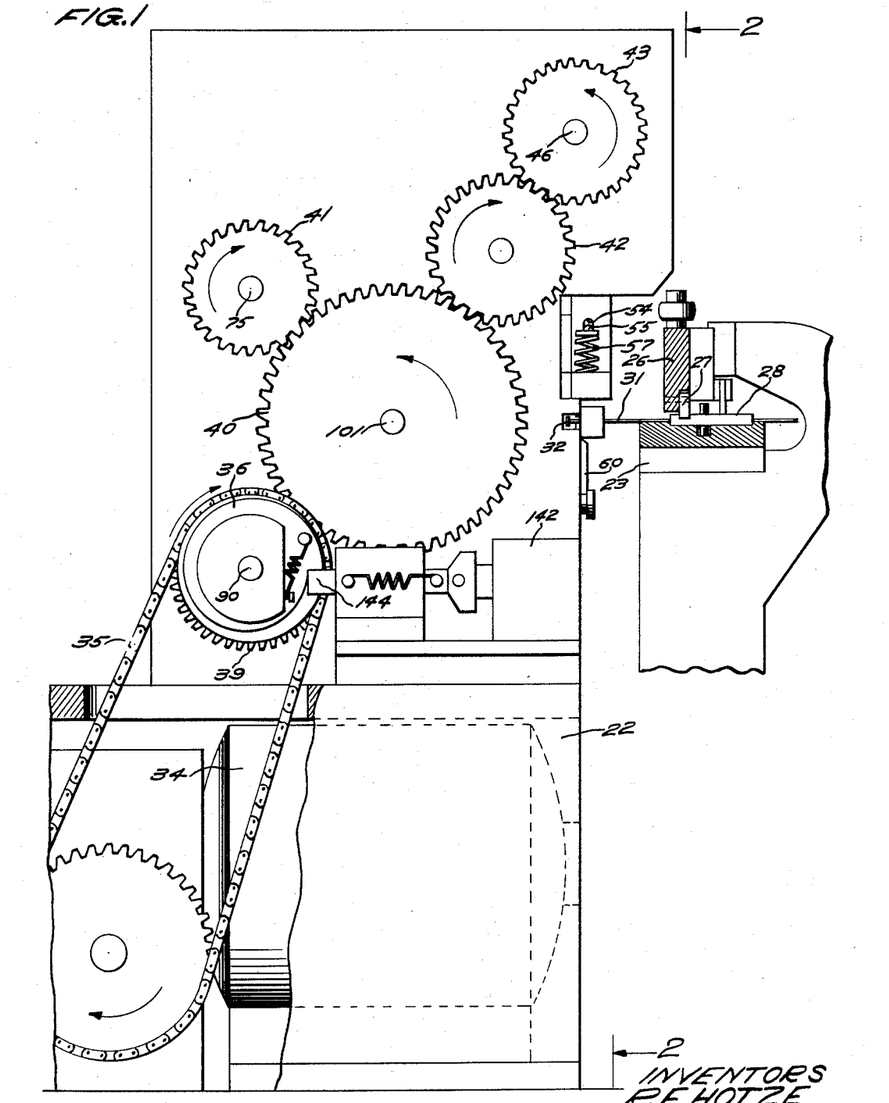
Fig. 1 is a side view of a device forming one embodiment of the invention and showing a transfer mechanism holding a wire-spring relay comb in test position.
Figure 6:
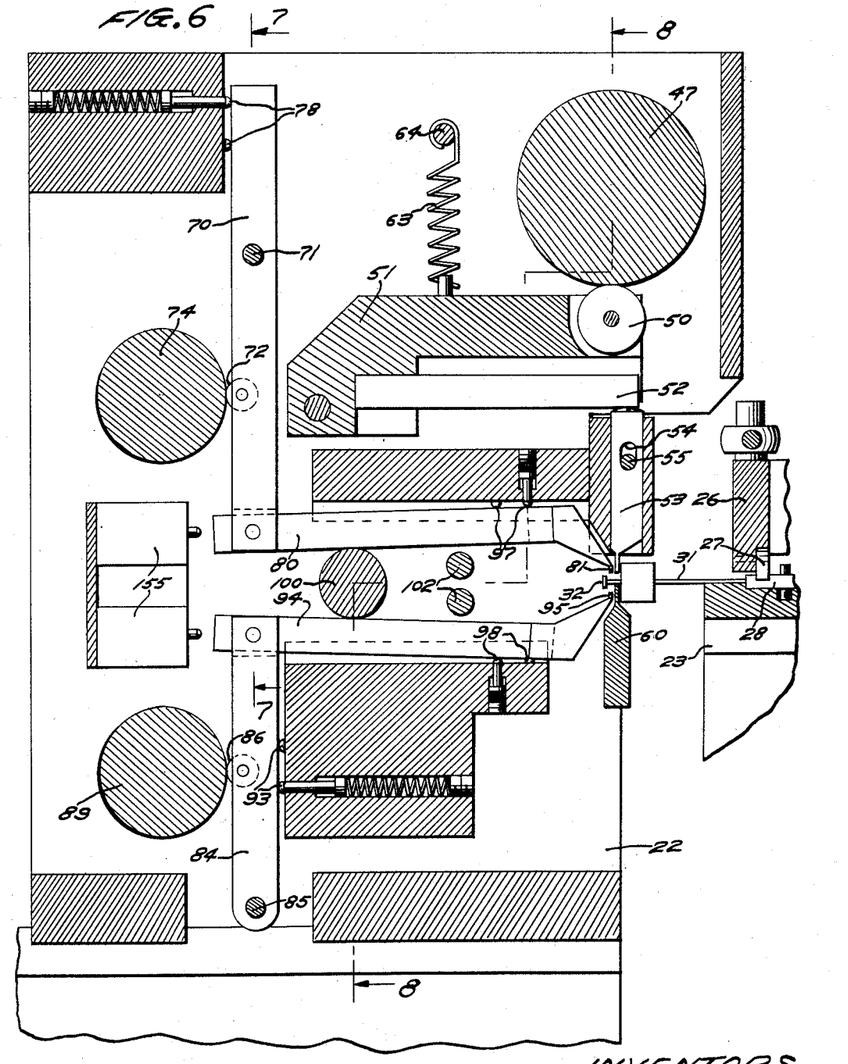
Fig. 6 is a cross-sectional view taken on line 6—6 of Fig. 2 illustrating the general relationship of the various elements of the device.
Figures 7, 8, 9:
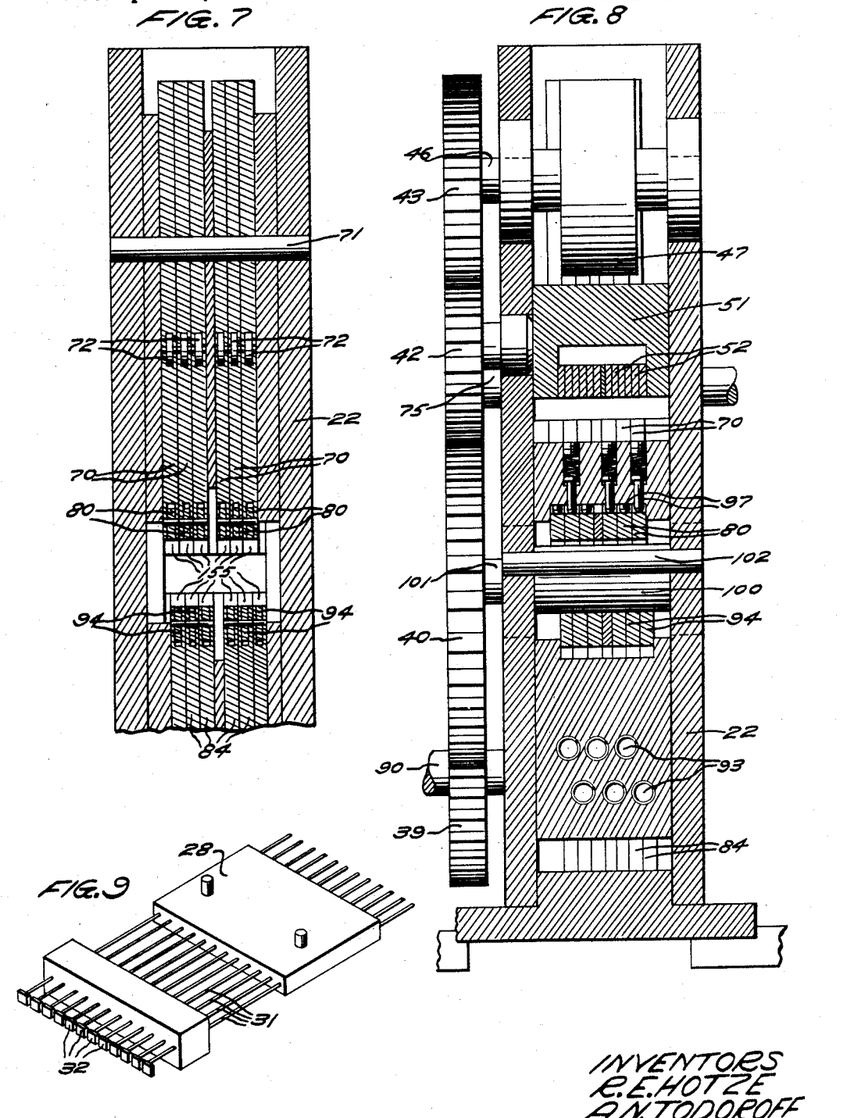
Fig. 7 is a sectional view taken on line 7—7 of Fig. 6 showing the arrangement of a plurality of bars connected to the pulling elements.
Fig. 8 is a sectional view taken along line 8—8 of Fig. 6 showing spring-loaded plungers which urge end portions of the pulling elements into position behind the contacts of the wires.
Fig. 9 is a perspective view of a wire-spring relay comb having welds to be tested.

Referring now in detail to the drawings, a base 21 is shown supporting a framework 22 which is positioned adjacent to a transfer mechanism 23 of a well-known type. The transfer mechanism 23 is provided with a reciprocated bar 26 having a pawl 27 for engaging a molded body 28 of a wire-spring relay comb having wires 31 and contacts 32 which are welded to the wires 31. The reciprocated bar 26 moves a wire-spring relay comb into test position, as illustrated in Figs. 1 and 6, upon each stroke and also upon each stroke moves a previously tested wire comb from the test position.

Figures 2, 3, 4, 5:
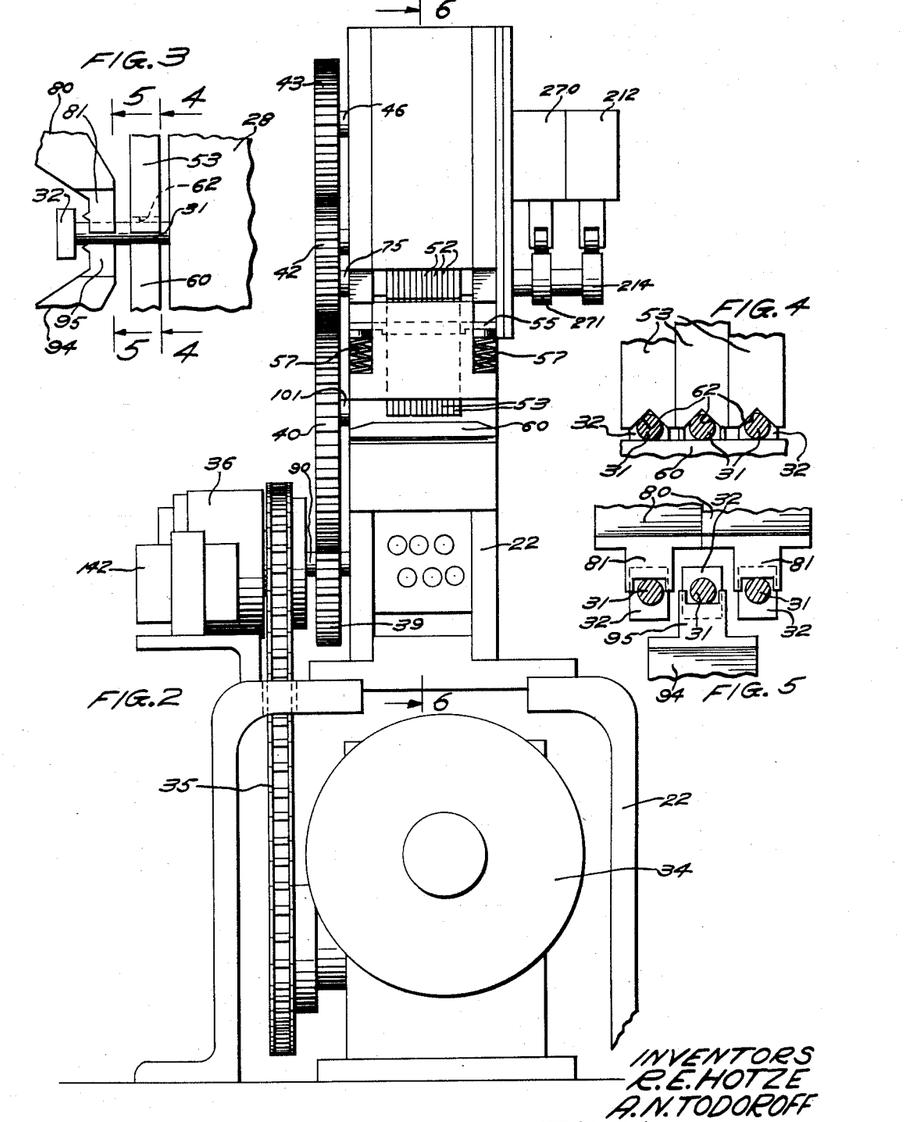
Fig. 2 is a view taken along line 2—2 of Fig. 1 illustrating a gear train and driving mechanism of the device.
Fig. 3 is an enlarged fragmentary side view showing the wires of the wire-spring relay comb in clamped position with pulling elements in alignment with the contacts.
Fig. 4 is a sectional view taken on line 4—4 of Fig. 3 depicting the manner in which a plurality of clamping members cooperate with an anvil to clamp the wires of the comb.
Fig. 5 is a sectional view taken along line 5—5 of Fig. 3 showing the positioning of the pulling elements relative to the wires.

A driving motor 34 (Figs. 1 and 3) mounted on the base 21 is connected by a chain 35 to a single revolution clutch 36 mounted on the framework 22. The clutch 36 is provided with an output gear 39 meshed with a gear 40 which is, in turn, meshed with gears 41 and 42. The gear 42 is an idler gear meshed with a gear 43 secured to a shaft 46 which carries a clamping cam 47. The gear 40 has twice as many teeth as the gears 39, 41 and 43 so as to rotate through only 180° while the gears 39, 41 and 43 rotate through 360°.

The clamping cam 47 engages a roller 50 attached to a member 51 pivoted to the framework 22 and having a plurality of stiff flat springs 52 which engage a plurality of clamping elements 53 slidably mounted on the framework 22 and having slots 54 through which a pin 55 extends. The ends of the pin 55 are engaged by a pair of compression springs 57 for normally urging the clamping elements 53 upward. An anvil 60 secured to the framework 22 is provided for cooperating with the clamping elements 53 to grip the wires of the wire comb therebetween, the clamping elements 53 having in the lower ends thereof notches 62 for receiving the wires 31. A tension spring 63 connected between the member 51 and a pin 64 secured to the framework 22 normally urges the member 51 upward toward unclamped position.

A plurality of upper bars 70 pivotally mounted on a pin 71 attached to the framework 22 are provided with rollers 72 engaging a cam 74 mounted on a shaft 75 secured to the gear 41. The bars 70 are engaged by staggered spring-loaded plungers 78 which urge the rollers 72 into engagement with the cam 74. Each of the upper bars 70 is pivotally connected to an upper contact pulling element 80 having at the end thereof a spiked portion 81 for engaging the contact 32 to apply a force thereto. The width and spacing of the pulling elements 80 are such that only alternate contacts of the wire comb are engaged by the spiked portions 81.

A plurality of lower bars 84 pivotally attached to a pin 85 secured to the framework 22 are provided with rollers 86 engaging a cam 89 on a shaft 90 supporting the gear 39. A plurality of lower contact pulling elements 94 pinned to the lower bars 84 are provided with spiked end portions 95 which engage the alternate contacts 32 not engaged by the upper contact pulling elements 80.

Spring-loaded plungers 97 and 98 engage the upper and lower contact pulling elements to normally urge them together against a spreading cam 100 mounted on a shaft 101 secured to the gear 40. A pair of pins 102 attached to the framework 22 are positioned to engage and limit movement of the contact pulling elements 80 and 94 toward each other.

Control circuit

The device of the present invention is adapted to be positioned in an automatic assembly line immediately behind a device for welding the contacts 32 onto the wires 31. This welding device (which forms no part of this invention and which is not disclosed) is provided with a pair of welding guns which are generally designated as right and left welding guns. The transfer mechanism 23, a portion of which extends past the welding device, advances a pair of wire combs into position adjacent to the right and left guns and these guns simultaneously weld the contacts 32 onto the wires 31, whereupon two more wire combs are advanced into welding position. It can be seen from this that each gun welds contacts onto alternate wire combs. While an occasional failure of a weld is undesirable, it is a necessity that the welding device be stopped if it continues to produce faulty welds. This control circuit is provided for rendering the welding device, the transfer mechanism and the testing device inoperative in case either welding gun should produce defective welds on a predetermined number of consecutive wire combs.

Switches 119 and 120 are closed to apply power from a power source 121 to a solenoid 122 which then closes contactors 125 to apply power to the driving motor 34. Power is also supplied through a closed switch 128 to a "left gun" lamp 129 or a "right gun" lamp 130 through a contactor 132 or 133 depending upon which is closed by a relay 134. The purpose of the lamps 129 and 130 is to indicate whether the right welding gun or the left welding gun welded the contacts onto the wire comb being tested. A manually operated switch 137 is provided for stepping the relay 134 to extinguish one of the lamps 129 and to light the other if for some reason the wrong lamp should be lit. A pilot lamp 131 indicates that power is applied to the control circuit.

A relay 140 is energized when a cam 143 on the transfer mechanism closes a switch 145 at the end of its stroke. The relay 140 closes a contactor 141 to apply power to a solenoid 142 of the single revolution clutch 36. This momentarily withdraws a spring-loaded plunger 144 (Fig. 1) and permits the clutch 36 to rotate the gear 39 through 360°. This, in turn, rotates the gear 40 through 180° and rotates the gears 41 and 43 through 360°.

Each of the contacts 32 has associated therewith a diode 150, a capacitor 151, a relay 152, a normally open switch 155 and a normally closed switch 156. The switches 155 are each adapted to be engaged and closed by one of the contact pulling elements 80 or 94 when the contact associated with that switch breaks from its wire 31 under the testing force, whereupon the capacitor 151 discharges through and energizes the relay 152. If the weld is of proper strength, the contact 32 will not break off and the switch 155 will remain open. If, however, the contact 32 does break off, the switch 155 is closed to discharge the capacitor 151 through the relay 152, which opens contacts 157 and 158 and closes contacts 161 and 162.

Figure 10:
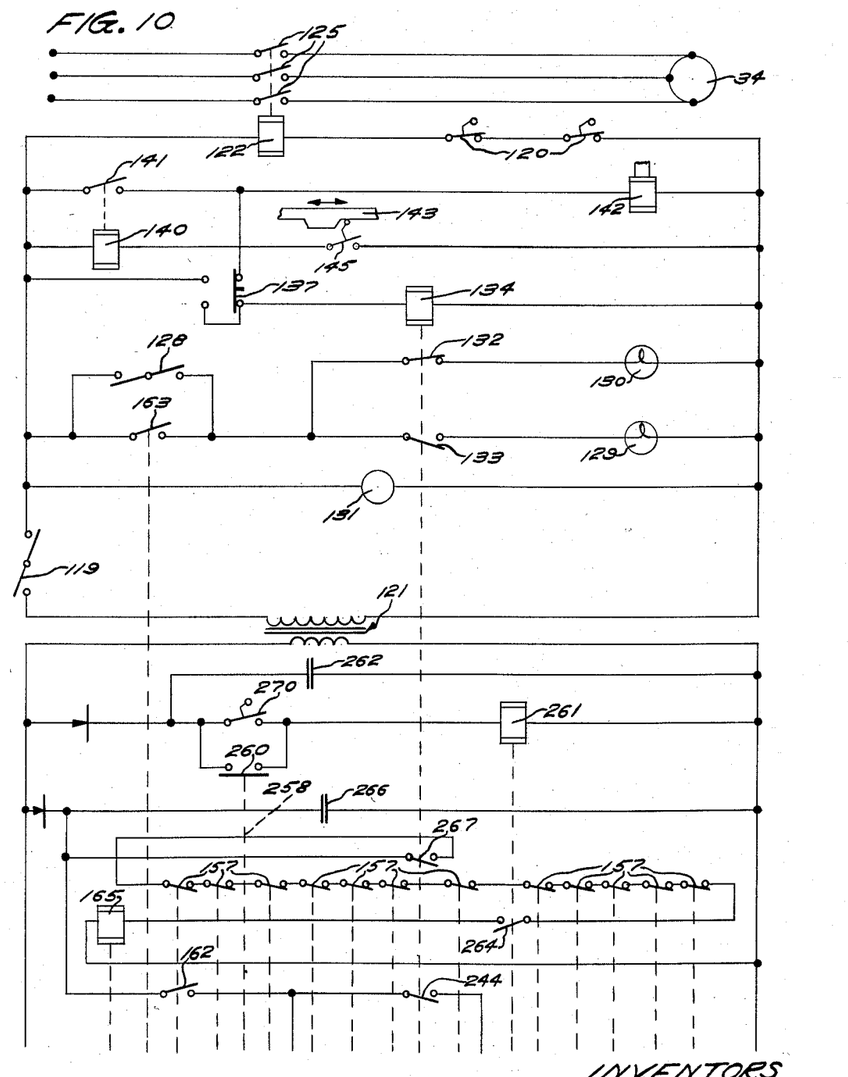
Figs. 10, 11, 12 and 13 are circuit diagrams of a system for controlling the device shown in Figs. 1–8.

The opening of the switch 155 deenergizes a left release relay 165 (Fig. 10) of a stepping switch 166 (Fig. 3) having a left stepping relay 167 for moving a left contactor 170 into sequential engagement with contact points 175–184. The contact points 175–184 are connected through normally open switches 190–199 to a relay 203 having contacts 204 and 205 through which power is applied to a control unit 208 for operating the welding device and a drive mechanism 209 for actuating the transfer mechanism. A switch 212 is closed by a cam 214 on the shaft 75 to apply power to the drive mechanism 209 through the normally closed contact only when the testing device has completed a testing cycle. A bypass switch 213 may be manually closed to shunt the contact 205 in case it should be desirable to operate the transfer mechanism without operating the welding device.

A right stepping relay 209 of a switch 210 moves a right contactor 211 into sequential engagement with contact points 215–224, inclusive. The contact points 215–224 are connected through switches 230–239, respectively, to the relay 203. A right release relay 225 is provided for returning the contactor 211 into engagement with the contact point 215. The opening of one of the contacts 158 by one of the relays 152 breaks the circuit to the right release relay 225 to prevent the return of the contactor 211 of the right stepping relay to the contact point 215.

The closing of one of the contacts 161 by one of the relays 152 applies power to an alarm bell 243 to indicate to an operator that a weld has been found defective. The closing of one of the contacts 182 by one of the relays 152 applies power to either the left stepping relay 167 or the right stepping relay 209, depending upon which one of contacts 244 or 245 is closed. The contacts 244 and 245 are actuated by the relay 134, one of these contacts being open while the other is closed. When a comb which was welded by the left gun is being tested, the contact 244 is closed and the contact 245 is open, whereas the contact 244 is open and the contact 245 is closed when a comb which was welded by the right gun is being tested.

Inasmuch as the relay 134 is energized each time the clutch solenoid 142 is energized by the closing of the switch 141, the contacts 244 and 245 will be actuated to apply power to the left stepping relay 167 when a comb from the left gun is tested and found having a defective weld and to apply power to the right stepping relay 209 when a comb from the right gun is tested and found having a defective weld. Left and right counters 248 and 249 are connected to the left and right stepping relays 167 and 209 for indicating the total number of combs having defective welds made by the left and right guns, respectively.

Figure 11:
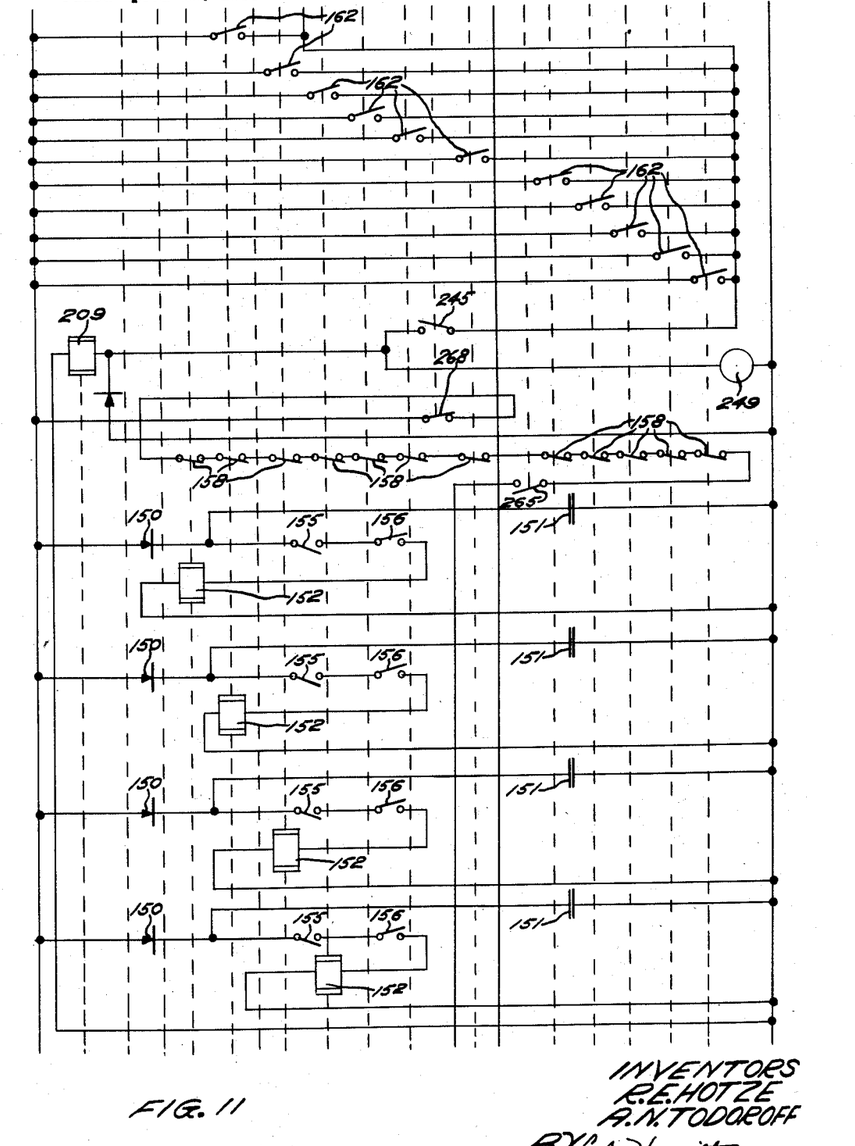
Figure 12:
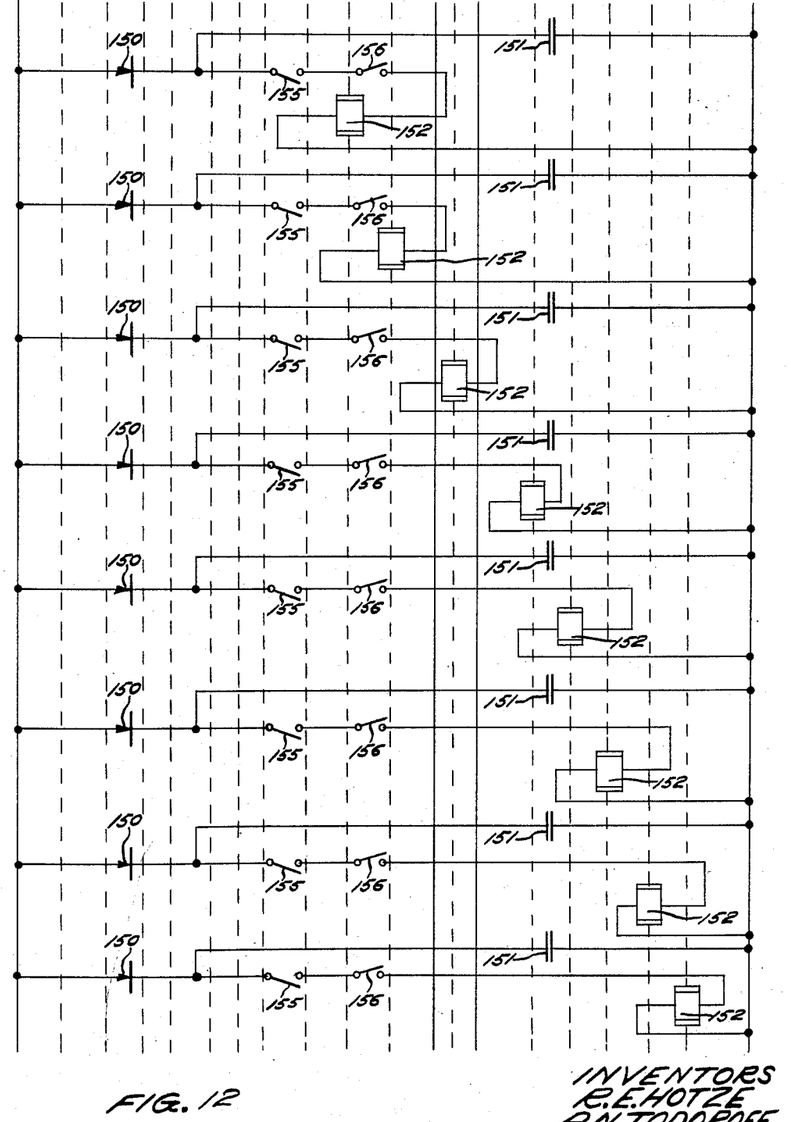

A relay 255 connected in parallel with the relay 203 closes a contact 256 to complete a locking circuit through a closed contact 257 of a manually operated switch 258 for holding the relays 203 and 255 in energized condition when a circuit is completed through the contactor 170 and one of the switches 190–199 or through the contactor 211 and one of the switches 231–239. This locking circuit is maintained until the switch 258 is moved to close a contactor 260 which permits a capacitor 262 to discharge through and energize a relay 261. The relay 255 also closes a contact 163 to apply power to one of the lamps 129 or 130, in case the switch 128 is open. The switch 128 is left open when the testing device is cycled without the welding device being operated. The relay 261 closes contacts 264 and 265 for energizing one of the release relays 165 or 225, depending upon which one of contacts 267 or 268 is closed. A capacitor 266 is provided for effecting a fast energization of the relays 165 and 225. The contacts 267 and 268, only one of which is closed at any one time, are actuated by the relay 134. A switch 270 (Figs. 2 and 11) actuated by a cam 271 mounted on the shaft 75 completes a circuit to the relay 261 after each comb has been tested for energizing the relay to apply power to one of the release relays 165 or 225.

If a comb from the left gun has been tested, the left release relay 165 will be energized through the closed contact 267, assuming that no defective welds were found and all of the contacts 157 are closed. Power will not be applied to the right release relay, for the reason that the contact 268 is held open by the relay 134. If a comb from the right gun has been tested, the right release relay 225 will be energized through the closed contacts 268, 158 and 265. Thus, if no weld has been found defective (i.e., no contact 32 has been pulled off its wire 31) the contactor 170 or 211, depending upon whether the comb came from the left gun or the right gun, will be returned to its starting point, which is the contact point 175 or 215. If, however, a weld has been found defective, one of the switches 157 will be held open by one of the pulling elements 80 or 94 and the contactor 170 or 211 will remain at the contact point to which it has been advanced.

Operation of apparatus

The switches 119 and 120 are closed to apply power to the control circuit. The switch 212 is held closed by the cam 214 to apply power to the drive mechanism 209, whereupon the transfer mechanism 23 is actuated to advance a wire comb into test position. Assume that this comb had contacts 32 welded thereunto by the right welding gun. Contacts 132, 245 and 268 of the relay 134 will be closed and contacts 133, 267 and 244 will be open.

As the transfer mechanism completes its stroke, the cam 143 closes the switch 145 to apply power to the solenoid 140 which momentarily withdraws the plunger 144 of the single revolution clutch 36. This permits the gear 39 to rotate through 360°, thereby rotating the gear 40 through 180° and the gears 41 and 43 through 360°.

When the gear 43 and the cam 47 connected thereto have rotated approximately 45°, the member 51 is pivoted downward and the springs 152 engage and force the clamping elements 53 downward to clamp the wires 31 against the anvil 60. When the gear 40 and the cam 100 connected thereto have rotated approximately 20°, the pulling elements 80 and 94 are moved toward each other to position the spiked end portions 81 and 95 behind and in alignment with the contacts 32.

Upon further rotation of the gears 39, 40, 41 and 43, the cams 74 and 89 connected to the gears 39 and 41 permit the spring-loaded plungers 78 and 93 to move the pulling elements 80 and 94 to carry the end portions 81 and 95 thereof into engagement with the contacts 32 and apply a testing force thereto. If all of the welds are of sufficient strength, none of the contacts 32 break off and none of the normally open switches 155 are actuated by the contact pulling elements 80 and 94. If, however, one of the contacts 32 breaks off, the pulling element 80 or 94 associated with that contact is moved by the spring-loaded plunger 78 or 93 to close the switch 155. This switch will remain closed until the cams 74 and 89 have rotated approximately 180° more.

Operation of control circuit

As the transfer mechanism 23 moves to advance a welded comb into test position and to remove a previously tested comb from the testing device, the cam 143 closes the switch 145 to apply power to the relay 140. The relay 140 closes the contactor 141 to energize the clutch solenoid 142 which withdraws the plunger 144 and permits the device to go through the above-described testing cycle. The closing of the contact 141 also energizes the relay 134, which actuates contacts 132, 133, 267, 245.

Assume that the comb previously tested was welded by the left welding gun. The contacts 132 will now be closed to light the right gun lamp 130 to indicate that the comb now being tested was welded by the right welding gun. The closing of the contact 245 connects the right stepping relay 209 and the right counter 249 to the normally open switches 162. If one of the contacts 32 breaks off, one of the switches 155 will be closed to energize the relay 152 associated therewith, whereupon one of the contacts 162 is closed and the right stepping relay 209 and the right counter 249 are energized. The counter 249 indicates the total number of defective combs welded by the right gun, and the relay 209 steps the contactor 211 from the contact point 215 to the contact point 216.

As the device completes its mechanical testing cycle, the cam 271 closes the switch 270 to energize the relay 261. The relay 261 closes the contacts 264 and 265, but the right release relay 225 cannot be energized to return the contactor 211 to the contact point 215, for the reason that one of the contacts 158 is held open by the relay 152 connected to the switch 155 which was closed by one of the pulling elements 80 or 94.

Thus, the contactor 211 remains at the contact point 216 until the next comb from the right gun is tested. If the next comb from the right gun has a defective weld, the above procedure is repeated and the contactor 211 is stepped to the contact point 217. If the contacts 32 on the next comb from the right gun are properly welded, none of the contacts 158 will be open and the closing of the contact 265 by the relay 261 at the end of the test cycle will energize the right release relay 225 through the contacts 268, 158, 265. The energization of the release relay 225 returns the contactor 211 to the contact point 215. From this it can be seen that the contactor 211 is stepped forward each time a defective weld is found on a comb welded by the right gun and is returned to the contact point 215 each time a comb welded by the right gun is found having no defective welds. The left stepping switch 166 is operated in the same manner when a comb from the left gun is being tested.

Figure 13:
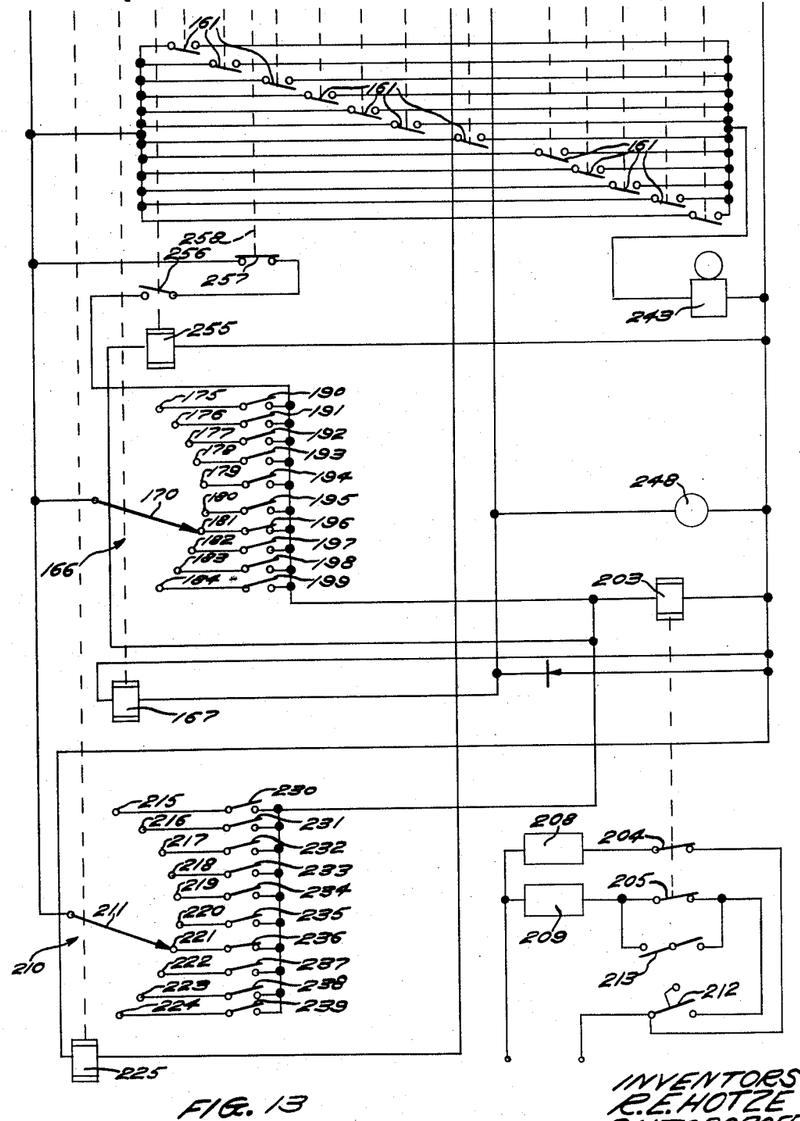
Figure 14:
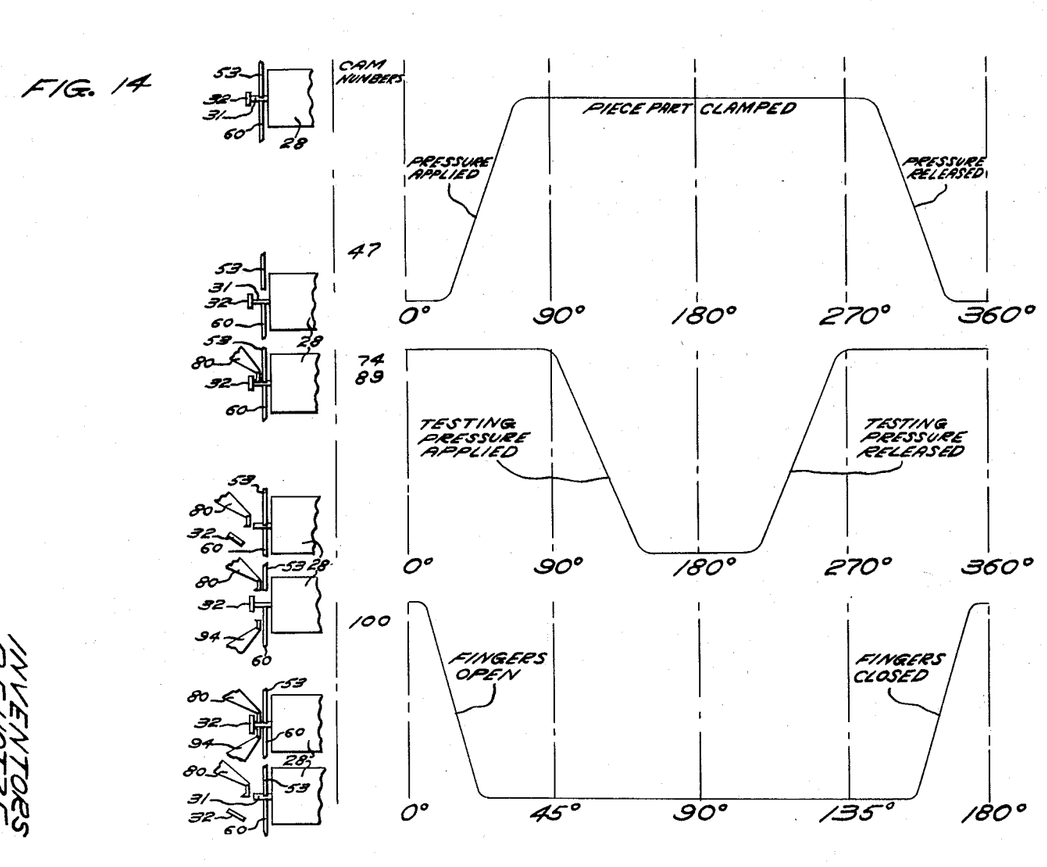
Fig. 14 is a cam chart illustrating the sequence of operation of the clamping member and the pulling elements.

In case of a malfunction of one of the welding guns, it is desirable to stop the welding device, the transfer mechanism 23 and the testing device. There may be an occasional faulty weld when the guns are functioning properly, but in the event of a malfunction of either gun, all combs welded by that gun are likely to have faulty welds. By closing one of switches 190–199 and one of the switches 230–239 an operator can select the number of consecutive combs having defective welds made by the left gun and the right gun, respectively, which must occur before the welding device is stopped. Switches 181 and 230 (Fig. 13) are shown closed to disable the welding device, the transfer mechanism and the testing mechanism after six consecutive combs from either gun are found to be defective.

When defective welds are made by the right gun on six consecutive combs (the switch 230 being closed), the contactor 211 will reach the contact point 221 in the manner described above to complete a circuit through the closed switch 236 to the relays 203 and 255. The relay 203 opens the contacts 204 and 205 to disable the welding device control unit 208 and the transfer drive mechanism 209. The relay 255 closes the contact 256 to complete the locking circuit which holds in the relays 203 and 255 until contactor 170 or 211 of the stepping switch 166 or 210 is manually returned to normal position and the contact 257 is manually opened. The same results are reached when the left gun makes defective welds on six consecutive combs.

It is desirable, for the sake of economy, to produce wire combs which do not have a contact welded onto each wire, whenever the application of the finished relay does not require the use of all contacts. It can be readily seen that, whenever a contact 32 is missing, it will appear that a defective weld has been found, since the pulling elements 80 and 94 will be free to close the switches 155. This undesirable result can be avoided by opening certain of the switches 156.

The switches 156 to be opened are those associated with wires 31 having no contacts. Thus, when one of the pulling elements 80 or 94 closes one of the switches 155 associated with a missing contact 32 (this being permitted because the missing contact is not present to restrain movement of the pulling element), the open switch 156 prevents the energization of the relay 152 associated with the missing contact. Thus, the missing contact 32 does not cause the control circuit to operate as though a defective weld has been found.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for fabricating and testing relay components, means for cyclically welding contacts to pairs of relay components one pair at a time, means for sequentially testing the weld strength of the contacts on a first component of each pair and then the other component of said pair, means for advancing each pair of components to the testing means so that said testing means receives said first component and then said other component in that order, and means operated by the testing means for interrupting operation of the securing means in response to weld failures on a predetermined number of consecutive first components or a predetermined number of consecutive said other components.

2. In a device for testing the strength of welds made on a succession of pairs of articles, each said pair having a first article and a second article, a device for exerting forces on each article tending to break the weld on said article, means for transferring a succession of pairs of articles to said force exerting device so that said device receives first and second articles alternately, means for cyclically operating said force exerting device to apply forces to each successive article advanced thereto by the transferring means, first counting means actuated by the force exerting device in response to a defective weld on a first article, second counting means actuated by the force exerting means in response to a defective weld on a second article, and means operated by a predetermined number of actuations of either the first or second counting means for interrupting operation of the transferring means.

3. In a device for determining the strength of welds made on pairs of articles, a first article of each pair having a weld made thereon by a first welding device and a second article of each pair having a weld made thereon by a second welding device, a first normally open clamping means, a second normally open clamping means spaced from the first clamping means, transfer means for carrying a succession of articles one at a time into said first and second clamping means, the second article of each pair following the first article of said pair, means for cyclically operating said transfer means, means operated by the cyclically operating means for closing said first and second clamping means to grip sections of each article advanced therein by the transfer means, means operated by the cyclically operating means for applying a force tending to impart a relative movement between said first and second clamping means to test each weld, and means operated by a predetermined relative movement of the clamping means for interrupting operation of said cyclically operating means in response to defective welds on a predetermined consecutive number of first articles or a predetermined consecutive number of second articles.

4. A device for testing strengths of welds between contacts welded onto pairs of relay components, a first component of each pair having its contact welded thereto by a first welding device and a second component of said pair having its contact welded thereto by a second welding device, comprising a base, a fixed clamping member on the base, a movable clamping member on the base for cooperating with the fixed clamping member to hold one of the relay components therebetween, means on the base for actuating the movable clamping member, a movable element mounted on the base for engaging and applying a force to the contact welded to the component, cam means on the base for moving the element into alignment with said component, resilient means on the base for urging said element against said component to stress the weld between the relay component and the contact, means on the base for advancing the components one at a time from the welding devices into position to be engaged by the clamping members, the second component of each pair following the first component of said pair, first means for counting defective welds found on first components, and second means for counting defective welds found on second components.

5. A device for sequentially testing welds between a plurality of wires and contacts of a relay component, comprising a base, a frame on the base, a fixed clamping member on the frame, transfer means for sequentially advancing the components into test position with the wires thereof positioned on the fixed clamping member, means for driving the transfer means, a movable clamping member on the frame for cooperating with the fixed clamping member to clamp the wires therebetween, means operated in timed relationship with the transfer means for actuating the movable clamping member, a plurality of bars pivotally mounted on the frame, a plurality of elements pivoted to the bars and having end portions for engaging the contacts, means on the base actuated in timed relationship with the transfer means for moving the elements into position to engage the contacts, resilient means normally urging the elements in a direction to apply force to the contacts for stressing the welds, and means actuated in timed relationship with the transfer means for normally resisting the urging means to prevent movement of the elements in said direction when the wires are not clamped.

6. A device for testing welds between pairs of first and second articles, comprising a base, an anvil on the base, a clamping member on the base for cooperating with the anvil to hold the first article in test position, cam means on the base for actuating the clamping member, a pulling element movably mounted on the base, cam and plunger means on the base for moving the pulling element into engagement with the second article and for applying a force thereto, a transfer mechanism adjacent to the base for advancing the pairs of articles sequentially into test position, means for driving the transfer mechanism, a stepping switch having a contactor, a relay for advancing the contactor of the stepping switch from a normal position, circuit means for energizing the relay each time a pair of articles is found to have a defective weld, a release relay for returning the contactor to said normal position each time a pair of articles is found to have no defective weld, a switch connected to the release relay and actuated by the pulling element to prevent energization of the release relay each time a pair of articles is found to have a defective weld, and means connected to the stepping switch for rendering the transfer mechanism driving means inoperative after a predetermined number of consecutive pairs of articles are found having defective welds.

7. A system for controlling a device for testing welds between pairs of articles sequentially advanced into test position by a transfer mechanism, comprising means for driving the transfer mechanism, means actuated by the transfer mechanism for operating the weld testing device through a cycle each time a pair of articles are advanced, a stepping switch having a contactor, circuit means for advancing the contactor of the stepping switch from a normal position each time a defective weld is found, means for returning the contactor of the stepping switch to said normal position each time a pair of articles is found to have no defective weld, and means connected to the stepping switch for rendering the transfer mechanism inoperative after a predetermined number of consecutive pairs of articles are found having faulty welds.

8. A system for controlling a device for testing welds between contacts welded onto electrical components sequentially advanced into test position by a transfer mechanism, comprising means for driving the transfer mechanism, means actuated by the transfer mechanism for operating the weld testing device through a cycle each time a component is advanced into test position, a stepping switch having a contactor, circuit means for advancing the contactor of the stepping switch from a normal position each time a component is found to have a defective weld, a release relay for releasing the stepping switch, a release circuit connected to the release relay and closed by the testing device for energizing said release relay after each component has been tested, means for breaking the release circuit to prevent energization of the release relay when a component is found to have a defective weld, and means for rendering the transfer mechanism inoperative upon the occurrence of defective welds on a predetermined number of consecutive components.

9. A device for testing the strength of welds between contacts and wires of a wire spring relay comb, comprising a base, a framework on the base, an anvil on the framework, a plurality of clamping members slidably mounted on the framework for cooperating with the anvil to hold the wires of the comb therebetween, said clamping members each having a slot therein, a pin extending through the slots in the clamping members, a pair of springs engaging the pin for urging the clamping members upward toward unclamped position, a member pivoted to the framework and having a plurality of resilient members for engaging the clamping members, means normally urging said member upward, a clamping cam on the framework for forcing said member downward to move the clamping members into cooperation with the anvil, a plurality of bars pivoted to the framework, a plurality of pulling elements pinned to the bars and having end portions for engaging and applying a force to the contacts, cam means on the framework for moving the pulling elements to a spread position behind the contacts, cam and plunger means on the framework for moving the end portions of the pulling elements into alignment with the contacts, a plurality of spring-loaded plungers on the framework and engaging the bars for forcing the pulling elements into engagement with the contacts and applying a force thereto, a gear train connected to the cams for operating said cams in timed relationship, and means for driving the gear train.

10. A system for controlling a device for testing welds made on electrical components by a welding device having first and second welding guns for welding alternate components, comprising a transfer mechanism for advancing the components one at a time from the welding device to the testing device, means for driving the transfer mechanism, means actuated by the transfer mechanism for operating the testing device through a cycle each time a component is advanced, a first stepping switch associated with components welded by the first gun and having a contactor, a first stepping relay for advancing the contactor of the first stepping relay each time a component welded by the first gun is found to have a defective weld, first release means for returning the contactor of the first stepping switch to a normal position each time a component welded by the first gun is found to have no defective weld, a second stepping switch associated with components welded by the second gun and having a contactor, a second stepping relay for advancing the contactor of the second stepping switch each time a component welded by the second gun is found to have a defective weld, second release means for returning the contactor of the second stepping switch to a normal position each time a component welded by the second gun is found to have no defective welds, and means connected to the stepping switches for rendering the transfer mechanism drive means and the welding device inoperative after a predetermined number of consecutive components welded by either gun are found to have defective welds.

References Cited in the file of this patent

UNITED STATES PATENTS

| | | |
|---|---|---|
| 1,635,536 | Butler | July 12, 1927 |
| 2,007,698 | Tear | July 9, 1935 |
| 2,100,502 | Campbell et al. | Mar. 30, 1937 |
| 2,268,815 | Funk | Jan. 6, 1942 |